US007603554B2

(12) United States Patent
Futa et al.

(10) Patent No.: US 7,603,554 B2
(45) Date of Patent: Oct. 13, 2009

(54) ENCRYPTION COMMUNICATION SYSTEM

(75) Inventors: Yuichi Futa, Osaka (JP); Masato Yamamichi, Ota (JP); Masami Yamamichi, legal representative, Ota (JP); Satomi Yamamichi, legal representative, Ota (JP); Keiko Yamamichi, legal representative, Maebashi (JP); Motoji Ohmori, Hirakata (JP); Makoto Tatebayashi, Takarazuka (JP)

(73) Assignee: Panasonic Corporation, Osaka (JP)

( * ) Notice: Subject to any disclaimer, the term of this patent is extended or adjusted under 35 U.S.C. 154(b) by 540 days.

(21) Appl. No.: 10/559,725

(22) PCT Filed: Jun. 14, 2004

(86) PCT No.: PCT/JP2004/008653

§ 371 (c)(1),
(2), (4) Date: Dec. 7, 2005

(87) PCT Pub. No.: WO2004/112310

PCT Pub. Date: Dec. 23, 2004

(65) Prior Publication Data

US 2006/0171530 A1 Aug. 3, 2006

(30) Foreign Application Priority Data

Jun. 12, 2003 (JP) ............................. 2003-167374

(51) Int. Cl.
*H04L 9/32* (2006.01)
(52) U.S. Cl. .................. 713/168; 713/176; 380/274
(58) Field of Classification Search ................ 713/168, 713/176; 380/274
See application file for complete search history.

(56) References Cited

U.S. PATENT DOCUMENTS 4,305,152 A * 12/1981 Asakawa et al. ............ 380/274

| 5,365,589 | A | 11/1994 | Gutowitz |
| 6,081,597 | A | 6/2000 | Hoffstein et al. |
| 2002/0116612 | A1 | 8/2002 | Yamamichi et al. |
| 2003/0226007 | A1* | 12/2003 | Olson et al. ................. 713/150 |

FOREIGN PATENT DOCUMENTS

JP 2002-252611 9/2002

OTHER PUBLICATIONS

Jeffrey Hoffstein et al., "NTRU: A Ring-Based Public Key Cryptosystem", Lecture Notes in Computer Science, 1423, pp. 267-288, Springer-Verlag, 1998.
John A. Proos, "Imperfect Decryption and an Attack on the NTRU Encryption Scheme", Jan. 7, 2003, pp. 1-28.
Menezes, Vanstone, Oorschot: "Handbook of Applied Cryptography", 1997, CRC Press LLC, USA, pp. 330, 364-365, 397-398, 506-507.

* cited by examiner

*Primary Examiner*—Kimyen Vu
*Assistant Examiner*—John B King
(74) *Attorney, Agent, or Firm*—Wenderoth, Lind & Ponack, L.L.P.

(57) ABSTRACT

An encryption transmission apparatus and an encryption reception apparatus avoid attack that takes advantage of a re-transmission request. A server apparatus encrypts a content key five times, thereby generating five encrypted content keys, calculates a hash value of the content key, and transmits the five encrypted content keys and the hash value. An image playback apparatus receives the five encrypted content keys and the hash value, decrypts the five encrypted content keys thereby generating five content keys, calculates hash values, each corresponding to the generated content keys, and compares the calculated hash values with the received hash value, respectively. If at least one of the five calculated hash values matches the received hash value, the corresponding content key is considered correct. Conversely, if none of the five calculated hash values matches the received hash value, it is considered a decryption error.

16 Claims, 9 Drawing Sheets

ENCRYPTION COMMUNICATION SYSTEM

TECHNICAL FIELD

The present invention relates to an encryption technology used as an information security technology.

BACKGROUND ART

Recently, the NTRU cryptosystem has been receiving attention because the NTRU cryptosystem can be implemented in a processor that has a comparatively low processing capability, typically used in home electrical appliances.

In the NTRU cryptosystem, a polynomial operation (addition and multiplication) is the basic operation, and each coefficient of the polynomial is 8 bits or below. Therefore even an 8-bit CPU can easily implement the NTRU cryptosystem. The NTRU cryptosystem is performed at 10-50 times as higher speed than an elliptic curve encryption, and does not necessitate a multiple precision arithmetic library that the elliptic curve encryption would require. The NTRU cryptosystem therefore has an advantage in having smaller code size than the elliptic curve encryption. The NTRU cryptosystem is detailed in non-patent reference 1 and in patent reference 1, and therefore is not described here.

However, sometimes the NTRU cryptosystem has a possibility of causing an error in decryption, and the occurrence of error is not detected at the time of decryption. This is a problem regarding the NTRU cryptosystem, because encryption cannot be guaranteed to be correctly performed.

To solve this problem, the patent reference 2 takes the following approach. Specifically, the transmission apparatus performs a one-way function on a plain text to generate a first functional value, generates first addition information, performs an invertible operation on the plain text and on the first addition information to generate concatenation information, and performs an encryption algorithm on the concatenation information to generate a cipher text. The reception apparatus generates second addition information that is identical to the first addition information, performs a decryption algorithm on the cipher text to generate decryption concatenation information, performs an inverse operation of the invertible operation on the decryption concatenation information and on the second addition information to generate a decrypted text, performs the one-way function on the decrypted text to generate a second functional value, compares the first functional value and the second functional value, and if the values are identical to each other, the decrypted text is judged to be correct. In the above way, it becomes possible to judge whether the plain text has been correctly decrypted.

If a plain text is judged to have been incorrectly decrypted, the receiving party can request that the transmitting party should re-transmit the cipher text, and receive the cipher text again.

(non-patent reference 1)
Jeffrey Hoffstein, Jill Pipher, and Joseph H. Silverman, "NTRU: A ring based public key cryptosystem", Lecture Notes in Computer Science, 1423, pp. 267-288, Springer-Verlag, 1998
(patent reference 1)
U.S. Pat. No. 6,081,597
(patent reference 2)
Japanese Laid-open Patent application No. 2002-252611
(non-patent reference 2)
J. Proos, "Imperfect Decryption and an Attack on the NTRU Encryption Scheme", IACR ePrint Archive, 2003/002, (2003)

The non-patent reference 2 discloses an attacking method used for the NTRU cryptosystem. In this attacking method, in an attempt to obtain a key, an attacker transmits arbitrary data to a receiving party, to check whether the receiving party transmits a re-transmission request. This is a problem because this means that security cannot be guaranteed in the NTRU cryptosystem.

BRIEF DISCLOSURE OF THE INVENTION

The object of the present invention is to provide an encryption communication system, an encryption transmission apparatus, an encryption transmission method, an encryption transmission program, an encryption reception apparatus, an encryption reception method, and an encryption reception program, which prevent an attack that takes advantage of a re-transmission request in the encryption systems.

MEANS FOR SOLVING THE PROBLEM

In view of the above-described problem, an encryption transmission apparatus encrypts one transmission message five times to generate five encrypted messages, calculates a hash value of the transmission message, and transmits the five encrypted messages and the hash value. An encryption reception apparatus receives the five encrypted messages and the hash value, decrypts the five encrypted messages to generate decrypted messages, calculates decryption hash values for the decrypted messages respectively, if at least one of the decryption hash values matches the hash value, a corresponding decrypted message is considered to be correct. If none of the five decryption hash values matches the hash value, a decryption error is considered to have occurred.

DETAILED DESCRIPTION OF THE INVENTION

The following explains an image playback system 10, which is one embodiment relating to the present invention.

1. Image Playback System 10

Figure 1:
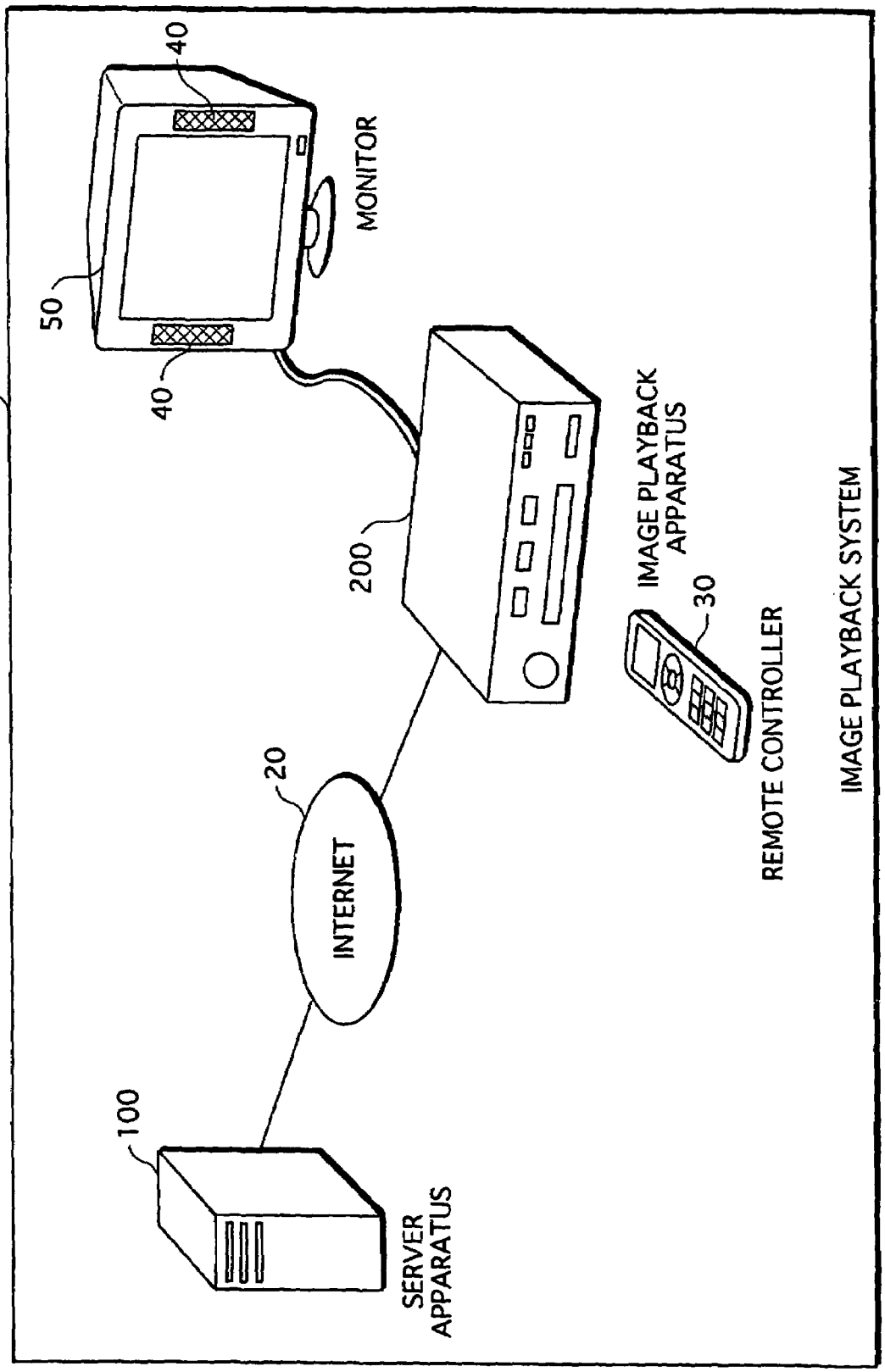
FIG. 1 is a system structure diagram showing the structure of the image playback system 10, which is an embodiment relating to the present invention.

The image playback system 10 is, as shown in FIG. 1, made up of a server apparatus 100 and an image playback apparatus 200, which are connected to each other via an Internet 20, and includes a remote controller 30 for controlling the image playback apparatus.

The server apparatus 100 encrypts a content, and transmits the encrypted content to the image playback apparatus 200 via the Internet 20. The image playback apparatus 200 receives the encrypted content, decrypts the received encrypted content to generate a content, plays back the generated content, and outputs the image and the audio to the monitor 50 and to the speaker 40, both of which are connected to the image playback apparatus 200.

Structure of Server Apparatus 100

Figure 2:
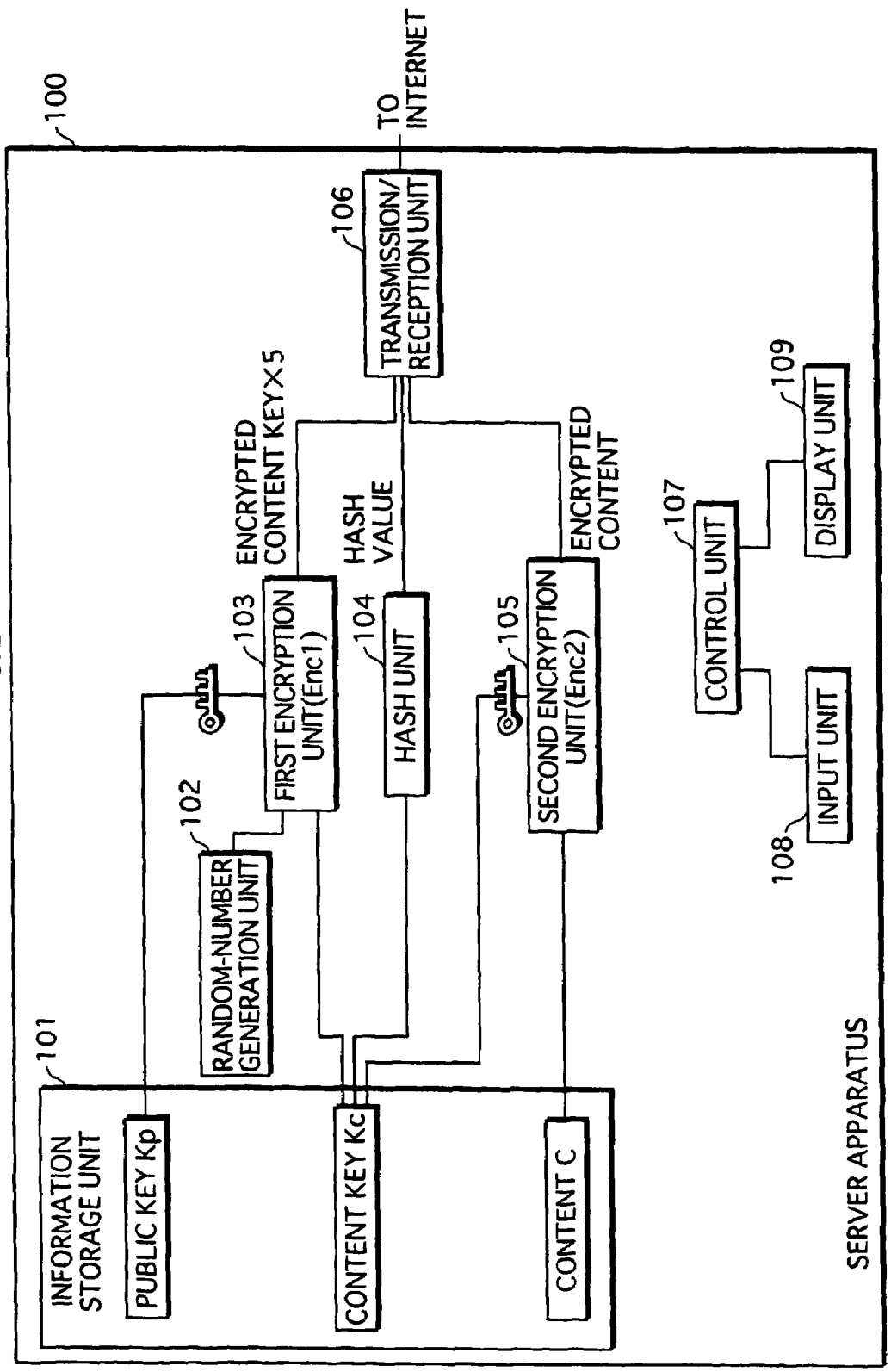
FIG. 2 is a functional block diagram showing the structure of a server apparatus 100.

The server apparatus 100 is, as shown in FIG. 2, made up of an information storage unit 101, a random-number generation unit 102, a first encryption unit 103, a hash unit 104, a second encryption unit 105, a transmission/reception unit 106, a control unit 107, an input unit 108, and a display unit 109.

The server apparatus 100 is specifically a computer system constituted by a microprocessor, a ROM, a RAM, a hard disk unit, a display unit, a key board, a mouse, and the like. The RAM or the hard disk unit records therein a computer program. The server apparatus 100 performs part of its function, by the microprocessor operating according to the computer program.

(1) Information Storage Unit 101

The information storage unit 101, as shown in FIG. 2, stores therein a public key Kp, a content key Kc, and a content C.

The public key Kp is generated based on a secret key Ks generated using a key generation method of the NTRU cryptosystem, and has 1841 bit length for a 263-dimension NTRU cryptosystem. The secret key Ks will be detailed later.

The content C is movie data made of image information and audio information.

(2) Random-Number Generation Unit 102

The random-number generation unit 102, by being controlled by the control unit 107, repeats, five times, a series of the following operations: generating a random number Ri having 64 bits; and outputting the generated random number Ri to the first encryption unit 103.

(3) First Encryption Unit 103

The first encryption unit 103, by being controlled by the control unit 107, reads the public key Kp and the content key Kc from the information storage unit 101. Then the first encryption unit 103 repeats the following operations (a)-(c) five times, by being controlled by the control unit 107.

(a) Receive a random number Ri from the random-number generation unit 102.
(b) Concatenate the read content key Kc with the received random number Ri (i.e., Kc∥Ri).
(c) Perform an encryption algorithm Enc1 on the concatenation of the content key Kc and the random number Ri, to generate an encrypted content key Ekci.

i.e., $Ekci=Enc1(Kp, Kc\|Ri)$

Here "∥" is an operator representing concatenation, the encryption algorithm Enc1 is an algorithm of the NTRU cryptosystem, and X=Enc1(Y,Z) shows that the encryption algorithm Enc1 is performed on a plain text Z using a key Y, to generate a cipher text X.

In the above way, five encrypted content keys Ekc1, Ekc2, . . . , Ekc5 are generated.

Next, the first encryption unit 103 outputs the five encrypted content keys Ekc1, Ekc2, . . . , Ekc5, to the transmission/reception unit 106.

Please note here that, in FIG. 2, each block is connected to the other blocks, by a connection line (the drawing does not show all the connection lines). Each connection line signifies a path through which a signal or information is transmitted. In addition, among the connection lines connected to the block representing the first encryption unit 103, the connection line on which a key mark is drawn signifies a path through which information as a key is transmitted to the first encryption unit 103. The same thing applies to the block representing the second encryption unit 105. The same thing also applies to the other drawings.

(4) Hash Unit 104

The hash unit 104, by being controlled by the control unit 107, reads the content key Kc from the information storage unit 101 and performs a hash function "Hash" on the read content key Kc to generate a hash value H, the hash function "Hash" being a one-way function.

$H=Hash(Kc)$

Here, one example of the hash function "Hash" is SHA-1. Since the SHA-1 is publicly-known, the explanation thereof is omitted here. In this case, the length of the hash value H is 160 bits.

Next, the hash unit 104 outputs the generated hash value H to the transmission/reception unit 106.

(5) Second Encryption Unit 105

The second encryption unit 105, by being controlled by the control unit 107, reads the content key Kc and the content C from the information storage unit 101, and performs the encryption algorithm Enc2 on the read content C using the read content key Kc, to generate an encrypted content EC.

$EC=Enc2(Kc, C)$

Here, the encryption algorithm Enc2 is an algorithm of triple DES. Since the triple DES is publicly-known, the explanation thereof is omitted here.

Next, the second encryption unit 105 outputs the generated encrypted content EC to the transmission/reception unit 106.

(6) Transmission/Reception Unit 106

The transmission/reception unit 106 is connected to the image playback apparatus 200, via the Internet 20.

The transmission/reception unit 106, by being controlled by the control unit 107, receives the five encrypted content keys Ekc1, Ekc2, . . . , Ekc5 from the first encryption unit 103, receives the hash value H from the hash unit 104, and receives the encrypted content EC from the second encryption unit 105. The transmission/reception unit 106 then transmits the received five encrypted content keys Ekc1, Ekc2, . . . , Ekc5, the hash value H, and the encrypted content EC, to the image playback apparatus 200 via the Internet 20.

(7) Control Unit 107, Input Unit 108, and Display Unit 109

The control unit 107 controls the random-number generation unit 102, the first encryption unit 103, the hash unit 104, the second encryption unit 105, and the transmission/reception unit 106.

The input unit 108 receives an operation instruction from an operator of the server apparatus 100, and outputs the received instruction to the control unit 107.

The display unit 109 displays various kinds of information, by being controlled by the control unit 107.

Structure of Image Playback Apparatus 200

Figure 3:
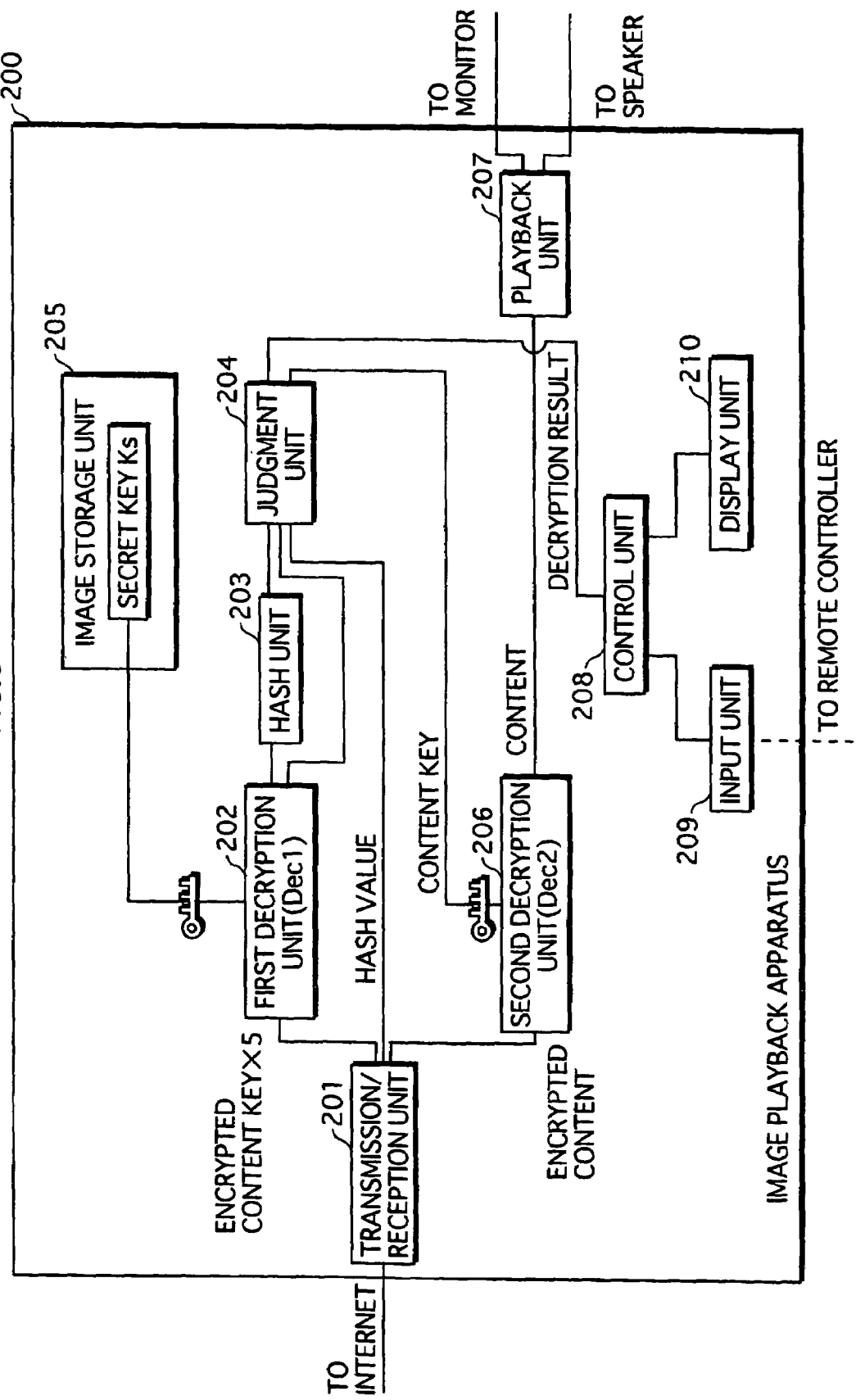
FIG. 3 is a functional block diagram showing the structure of an image playback apparatus 200.

The image playback apparatus 200 is, as shown in FIG. 3, made up of a transmission/reception unit 201, a first decryption unit 202, a hash unit 203, a judgment unit 204, an image storage unit 205, a second decryption unit 206, a playback unit 207, a control unit 208, an input unit 209, and a display unit 210.

Just as the server apparatus 100, the image playback apparatus 200 is constituted by a microprocessor, a ROM, a RAM, and so on. The RAM records therein a computer program. The image playback apparatus 200 performs part of its function, by the microprocessor operating according to the computer program.

(1) Image Storage Unit 205

As shown in FIG. 3, the image storage unit 205 stores therein a secret key Ks.

The secret key Ks is generated using the key generation method of the NTRU cryptosystem, and has 415 bit length for a 263-dimension NTRU cryptosystem.

(2) Transmission/Reception Unit 201

The transmission/reception unit 201 is connected to the server apparatus 100, via the Internet 20.

The transmission/reception unit 201, by being controlled by the control unit 208, receives the five encrypted content keys Ekc1, Ekc2, ..., Ekc5, the hash value H, and the encrypted content EC. The transmission/reception unit 201 outputs the five encrypted content keys Ekc1, Ekc2, ..., Ekc5 to the first decryption unit 202, outputs the hash value H to the judgment unit 204, and outputs the encrypted content EC to the second decryption unit 206.

(3) First Decryption Unit 202

The first decryption unit 202, by being controlled by the control unit 208, receives the five encrypted content keys Ekc1, Ekc2, ..., Ekc5, from the transmission/reception unit 201, and reads the secret key Ks from the information storage unit 205. The first decryption unit 202 repeats the following operations (a)-(c) five times, by being controlled by the control unit 208.

(a) Perform a decryption algorithm Dec1 on an encrypted content key EKci, using the secret key Ks, to generate a content key DKci.

$$DKci = Dec1(Ks, Ekci)$$

Here, the decryption algorithm Dec1 is an algorithm of the NTRU cryptosystem, and decrypts the cipher text generated according to the encryption algorithm Enc1. $Z=Dec1(Y,X)$ means to perform a decryption algorithm Dec1 on a cipher text X to obtain a decrypted text Z.

(b) From the generated content key DKci, delete the 64-bit random-number portion at the very last.

(c) Output the content key DKci from which the random-number portion has been deleted, to the hash unit 203 and to the judgment unit 204.

In the above way, five content keys DKci are outputted to the hash unit 203 and to the judgment unit 204.

(4) Hash Unit 203

The hash unit 203 performs the following operations (a)-(b) five times, by being controlled by the control unit 208.

(a) Receive a content key DKci from the first decryption unit 202.

(b) Perform the hash function "Hash" on the received content key DKci, to generate a hash value Hi.

$$Hi = \text{Hash}(DKci)$$

Next the hash unit 203 outputs the generated hash value Hi to the judgment unit 204.

(5) Judgment Unit 204

The judgment unit 204, by being controlled by the control unit 208, receives the hash value H from the transmission/reception unit 201, and repeats five times the following operations (a)-(d).

(a) Receives a hash value Hi from the hash unit 203.

(b) Receive a content key DKci from the first decryption unit 202.

(c) Judges whether the hash value H is identical to the hash value Hi.

(d) If judging affirmatively, stores the value of "i" and the content key DKci, in association.

If there is any value of "i" stored after the above operations (a)-(d) are performed five times, it is judged that the encrypted content key has been correctly decrypted, and the content key DKci stored in association with the value of "i" is outputted to the second decryption unit 206, and a decryption result showing that the decryption has been correctly performed is outputted to the control unit 208.

If there is no value of "i" stored, it is judged that the encrypted content key has not been correctly decrypted, and a decryption result representing such is outputted to the control unit 208.

(6) Second Decryption Unit 206

The second decryption unit 206, by being controlled by the control unit 208, receives the content key DKci from the judgment unit 204, receives the encrypted content EC from the transmission/reception unit 201, and performs a decryption algorithm Dec2 on the received encrypted content EC using the received content key DKci, to generate a content C.

Here, the decryption algorithm Dec2 is an algorithm of triple DES, and decrypts the cipher text generated according to the encryption algorithm Enc2.

Then, the second decryption unit 206 outputs the generated content C to the playback unit 207.

(7) Playback Unit 207

The playback unit 207, by being controlled by the control unit 208, receives a content C, plays back the received content C, generates an image signal and an audio signal, and outputs the image signal and the audio signal to the monitor 50 and to the speaker 40, respectively.

The monitor 50 and the speaker 40 respectively output the images and the corresponding audio.

(8) Control Unit 208, Input Unit 209, and Display Unit 210

The control unit 208 controls the transmission/reception unit 201, the first decryption unit 202, the hash unit 203, the judgment unit 204, the second decryption unit 206, and the playback unit 207.

The control unit 208 receives a decryption result either showing that the encrypted content key has been correctly decrypted, or showing that it has not been correctly decrypted.

When receiving a decryption result showing that the encrypted content key has not been correctly decrypted, the control unit 208 controls the second decryption unit 206 not to perform decryption, and controls the display unit 210 to display "decryption error".

When receiving a decryption result showing that the encrypted content key has been correctly decrypted, the control unit 208 controls the second decryption unit 206 to perform decryption.

The input unit 209 receives an operation instruction from a user of the image playback apparatus 200, and outputs the received instruction to the control unit 208.

The display unit 210 displays various types of information, by being controlled by the control unit 208.

Operation of Image Playback System 10

The following describes operations performed by the image playback system 10.

(1) Operation of Server Apparatus 100

Figure 4:
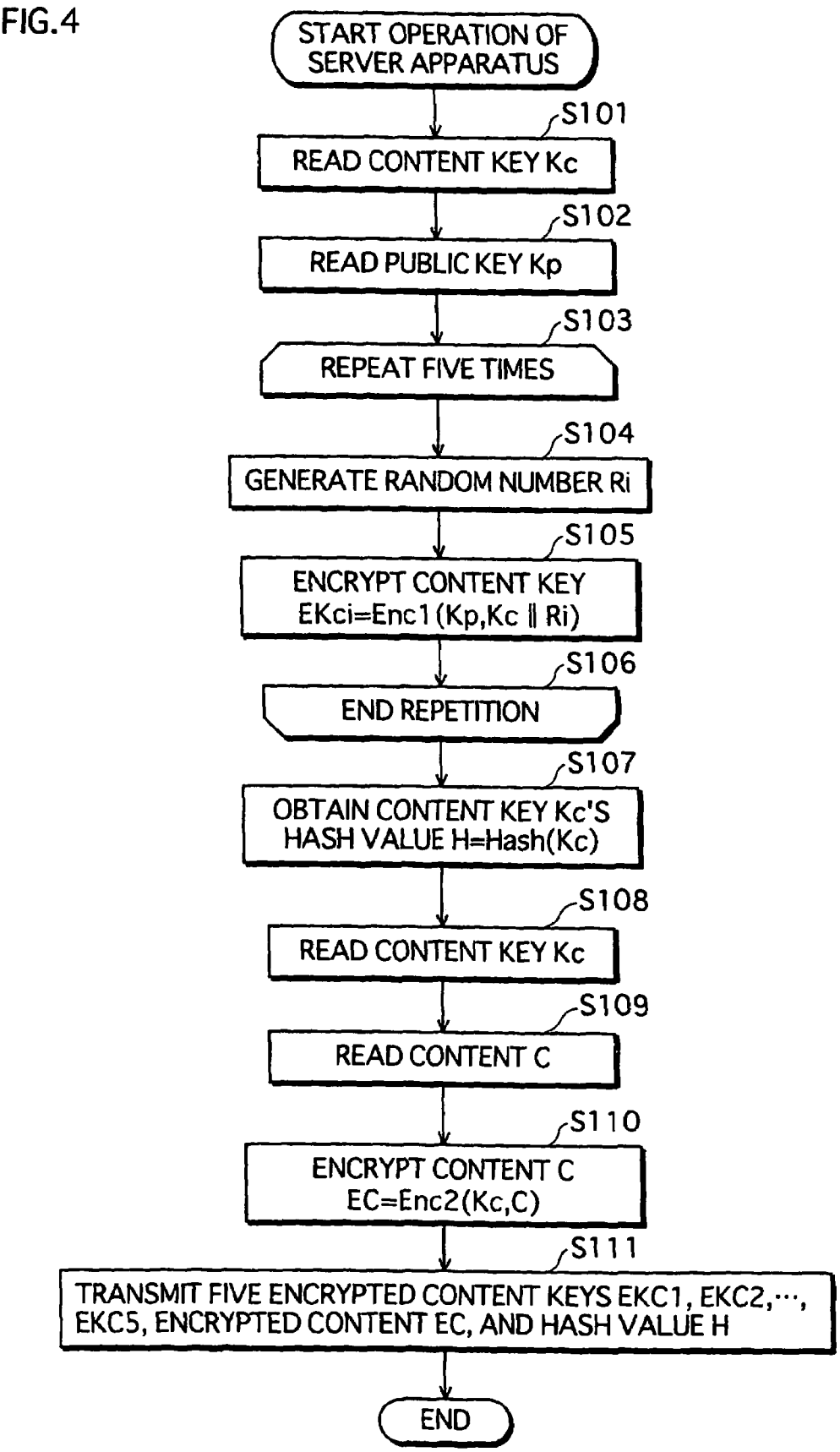
FIG. 4 is a flowchart showing the operation of the server apparatus 100.

The following describes operations of the server apparatus 100, with use of the flowchart shown in FIG. 4.

The first encryption unit 103 reads a content key Kc from the information storage unit 101 (Step S101), and then reads a public key Kp (Step S102).

Next, the control unit 107 performs control so that Steps S104-S105 are repeated five times, at Steps S103-S106. Please note that in the notations of the random number Ri and the encrypted content key Ekci, the "i" is a suffix representing a time of repeating, and changes to i=1, 2, 3, 4, 5, at each repetition.

The random-number generation unit 102 generates a random number Ri of 64 bits, outputs the generated random number Ri to the first encryption unit 103 (Step S104). The first encryption unit 103 concatenates the content key Kc with the random number Ri, and performs the encryption algorithm Enc1 on the concatenation of the content key Kc and the random number Ri, thereby generating an encrypted content key EKci (Step S105).

By repeating Steps S104-S105 five times in the above way, five encrypted content keys Ekc1, Ekc2, . . . , Ekc5 are generated.

Next, the hash unit 104 reads the content key Kc from the information storage unit 101, and performs a hash function "Hash", being a one-way function, on the read content key Kc, thereby generating a hash value H (Step S107).

The second encryption unit 105 reads the content key Kc from the information storage unit 101 (Step S108), reads the content C (Step S109), and performs an encryption algorithm Enc2 on the read content C using the read content key Kc, thereby generating an encrypted content EC (Step S110).

The transmission/reception unit 106 transmits the five encrypted content keys EKc1, EKc2, . . . , EKc5, the hash value H, and the encrypted content EC, to the image playback apparatus 200 via the Internet 20 (Step S111).

(2) Operation of Image Playback Apparatus 200

Figure 5:
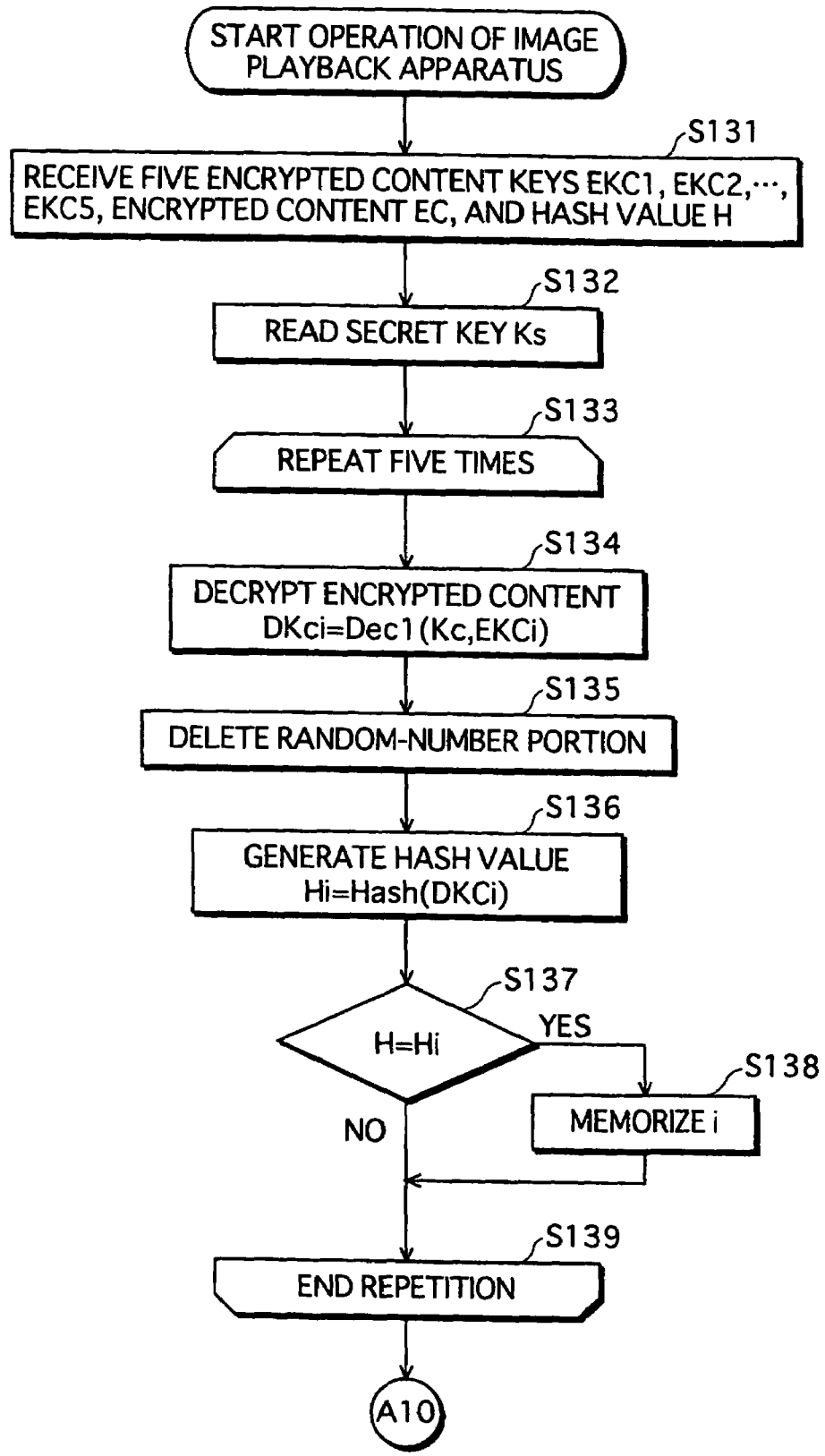
FIG. 5 is a flowchart showing the operation of the image playback apparatus 200, to be continued to FIG. 6.
Figure 6:
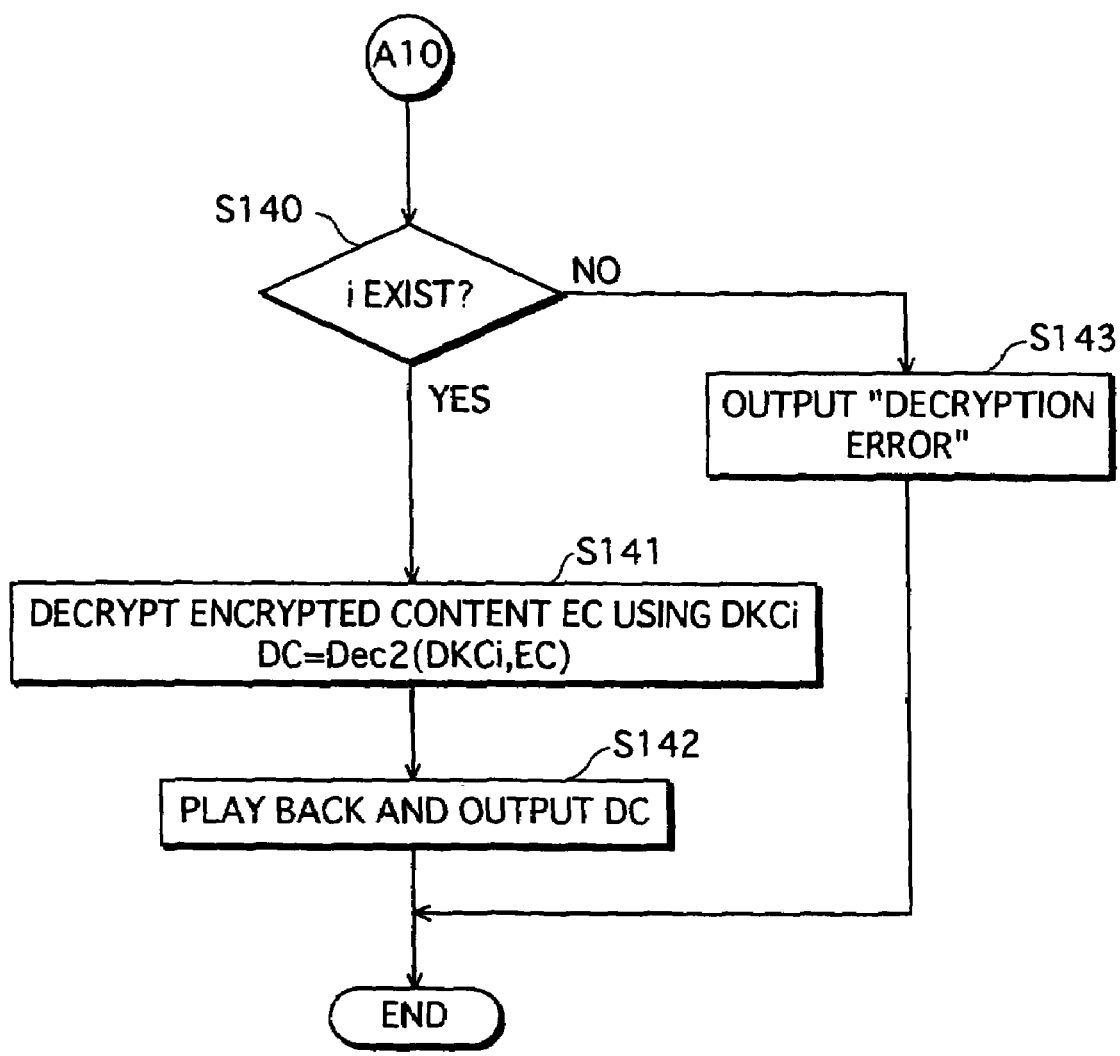
FIG. 6 is a flowchart showing the operation of the image playback apparatus 200, which is a continuation from FIG. 5.

The following describes operations of the image playback apparatus 200, with use of the flowcharts shown in FIGS. 5 and 6.

The transmission/reception unit 201 receives the five content keys EKc1, EKc2, . . . , EKc5, the hash value H, and the encrypted content EC, from the server apparatus 100 and via the Internet 100, and outputs the content keys EKc1, EKc2, . . . , EKc5 to the first decryption unit 202, the hash value H to the judgment unit 204, and the encrypted content EC to the second decryption unit 206 (Step S131).

The first decryption unit 202 reads the secret key Ks from the information storage unit 205 (Step S132). Next, the control unit 208 performs control so that Steps S134-S138 are repeated five times, at Steps S133-S139. Please note that in the notations of the encrypted content key Ekci, the content key DKci, and the hash value Hi, the "i" is a suffix representing a time of repeating, and changes to i=1, 2, 3, 4, 5, at each repetition.

The first decryption unit 202 performs a decryption algorithm Dec1 on the encrypted content key Ekci, using the secret key Ks, thereby generating a content key DKci (Step S134), and from the generated content key DKci, deletes a 64-bit random-number portion at the very last, and outputs the content key DKci from which the random-number portion has been deleted, to the hash unit 203 and to the judgment unit 204 (Step S135).

Then, the hash unit 203 receives the content key DKci from the first decryption unit 202, and performs the hash function "Hash" on the received content key DKci, thereby generating a hash value Hi (Step S136).

The judgment unit 204 receives the hash value Hi from the hash unit 203, receives the content key DKci from the first decryption unit 202, judges whether the hash value H and the hash value Hi are identical (Step S137), and if they are identical (Step S137), memorizes the value of "i" at this time, in correspondence with the content key DKci (Step S138).

After Steps S134-S138 are repeated five times, if there is a memorized value of "i" (Step S140), it is judged that the decryption of the encrypted content key has been correctly performed, and so the second decryption unit 206 receives the content key DKci from the judgment unit 204, receives the encrypted content EC from the transmission/reception unit 201, and performs the decryption algorithm Dec2 on the received encrypted content EC using the received content key DKci, thereby generating a content C (Step S141). The playback unit 207 receives the content C from the second decryption unit 206, plays back the content C, generates an image signal and an audio signal, and outputs the image signal and the audio signal to the monitor 50 and to the speaker 40, respectively. The monitor 50 and the speaker 40 respectively output the images and the corresponding audio (Step S142).

If there is no memorized value of "i" (Step S140), the judgment unit 204 judges that none of the five encrypted content keys was decrypted correctly, and so outputs a decryption result indicating such to the control unit 208. The control unit 208 controls the second decryption unit 206 not to perform decryption, controls the display unit 210 to display "decryption error", and so the display unit 210 displays "decryption error" (Step S143).

In the above description, the control unit 208 performs control so that Steps S134-S138 are repeated five times, at Steps S133-S139. It is also possible that if the hash value H and the hash value Hi are judged to be identical at Step S137, the control can come out of the loop of Steps S134-S138.

SUMMARY

As described above, this embodiment attempts to reduce the possibility that a message m ("content key" in the embodiment) cannot be decrypted, by encrypting and transmitting the message m for several times. Accordingly, re-transmission request for the message m will not occur so much.

The transmission apparatus ("server apparatus" in the embodiment) generates random numbers R1-R5, generates m||R1, m||R2, m||R3, m||R4, and m||R5, and encrypts each of them, to generate Enc(m||R1), Enc(m||R2), Enc(m||R3), Enc(m||R4), and Enc(m||R5). Here, Enc(x) means to perform the encryption algorithm Enc on the plain text X, to generate a cipher text. Next, the hash value H (m) is calculated. The generated Enc(m||R1), Enc(m||R2), Enc(m||R3), Enc(m||R4), and Enc(m||R5), together with the hash value H(m) are then transmitted to the reception apparatus ("image playback apparatus" in the embodiment).

The reception apparatus receives the Enc(m||R1), Enc(m||R2), Enc(m||R3), Enc(m||R4), and Enc(m||R5), together with the hash value H(m), and decrypts Enc(m||R1), Enc(m||R2), Enc(m||R3), Enc(m||R4), and Enc(m||R5), to obtain a part of each of them, namely, m1, m2, . . . m5, which corresponds to a message. Furthermore, the hash value of each of m1, m2, . . . m5 is calculated (H(m1), H(m2), . . . H(m5)). Then each of the calculated hash values is compared to the hash value H(m). In this comparison, if there is at least one matching pair of the calculated hash value and the received hash value H(m), then the message (out of m1, m2, . . . m3) that corresponds to the matching hash value is outputted as a decrypted text. If there is no such matching pair, "False" indicating decryption error is outputted.

In the NTRU cryptosystem of 263 dimensions, the probability of causing decryption error for one cipher text is about $10^{-5}$. Since five cipher texts are transmitted in the above-described embodiment, the probability of causing re-transmission request will be about $10^{-25}$ ($=10^{-5}*10^{-5}*10^{-5}*10^{-5}*10^{-5}$). On the other hand, the probability of attack success in the 1024-bit RSA encryption is $2^{-80}=10^{24}$. Therefore, if the above-described embodiment is applied to the 263-dimension NTRU cryptosystem, the probability of attack success becomes lower than the case of the 1024-bit RSA encryption.

2. Other Modification Examples

So far, the present invention has been described based on the above-described embodiment. However needless to say, the present invention should not be limited to the above-described embodiment, and may include the following cases.

(1) In the above-described embodiment, five encrypted content keys are transmitted. However, five encrypted contents may be transmitted instead.

(2) In the above-described embodiment, the transmission apparatus generates five cipher texts and transmits them, and the reception apparatus receives the five cipher texts and decrypts them. However, the number of the cipher texts is not limited to 5, and may be 3, or 7, for example. In addition, the transmission apparatus may generate two or more cipher texts and transmit them, and the reception apparatus receives these cipher texts, decrypts them, and uses them in judgment as to whether decryption error has occurred. As stated above, the number of cipher texts affects the probability of attack success, and larger the number of cipher texts, the probability of attack success will be lessened.

(3) In the above-described embodiments, an encryption algorithm is performed on a concatenation of the message m to be encrypted and a random number generated each time. However, the transmission apparatus may perform another operation on the message m in advance, and perform the encryption algorithm on the concatenation of the operation result and the random number.

For example, the transmission apparatus may add, to the message m, "0", "1", "2", "3", and "4", respectively, to obtain "m", "m+1", "m+2", "m+3", and "m+4". The transmission apparatus then performs an encryption algorithm on each concatenation of a calculation result and a random number, to generate Enc(m∥R1), Enc(m+1∥R2), Enc(m+2∥R3), Enc(m+3∥R4), Enc(m+4∥R5).

The reception apparatus decrypts Enc(m∥R1), Enc(m+1∥R2), Enc(m+2∥R3), Enc(m+3∥R4), Enc(m+4∥R5), and deletes, from each of the decryption results, a random-number portion at the very last, the random-number portion having a predetermined length. The reception apparatus then subtracts "0", "1", "2", "3", "4", respectively from the decryption results from which their random-number portion has been subtracted, thereby obtaining information that corresponds to the message m.

(4) In the above-described embodiment, the transmission apparatus concatenates the message m with the random number, in the stated order, and performs an encryption algorithm on the concatenation results. However, the order of concatenation may be reversed (i.e., the random number and the message m may be concatenated in this order). Moreover, the message m and the random number may be alternately concatenated bit by bit. If such concatenation methods are adopted, the reception apparatus can obtain information corresponding to the message m, by performing their reverse operation, respectively.

(5) In the above-described embodiment, the server apparatus transmits five encrypted content keys, an encrypted content, and a hash value, to the image playback apparatus via the Internet. However, the present invention is not limited to this embodiment.

It is also possible that a digital broadcast transmission apparatus (instead of the server apparatus) may broadcast the five encrypted content keys, the encrypted content, and the hash value, via a digital broadcast wave (instead of the Internet), and that a digital broadcast reception apparatus (instead of the image playback apparatus) receives the digital broadcast wave, to extract the five encrypted content keys, the encrypted content, and the hash value, from the received digital broadcast wave.

(6) The image playback system 10 may include the image playback apparatus 200b and the memory card 300b, instead of the image playback apparatus 200.

The image playback apparatus 200b is equipped with a part of the function that the image playback apparatus 200 includes, and the memory card 300b is equipped with the other part of the function that the image playback apparatus 200 includes.

Which is to say, the memory card 300b, being inserted to the image playback apparatus 200b by a user, receives the five encrypted content keys and the hash value from the server apparatus 100, judges whether the encrypted content keys have been correctly decrypted, and if judging affirmatively, outputs the correctly decrypted content key to the image playback apparatus 200b. The image playback apparatus 200b receives the content key from the memory card 300b, and decrypts the encrypted content received from the server apparatus 100, for playback.

Figure 7:
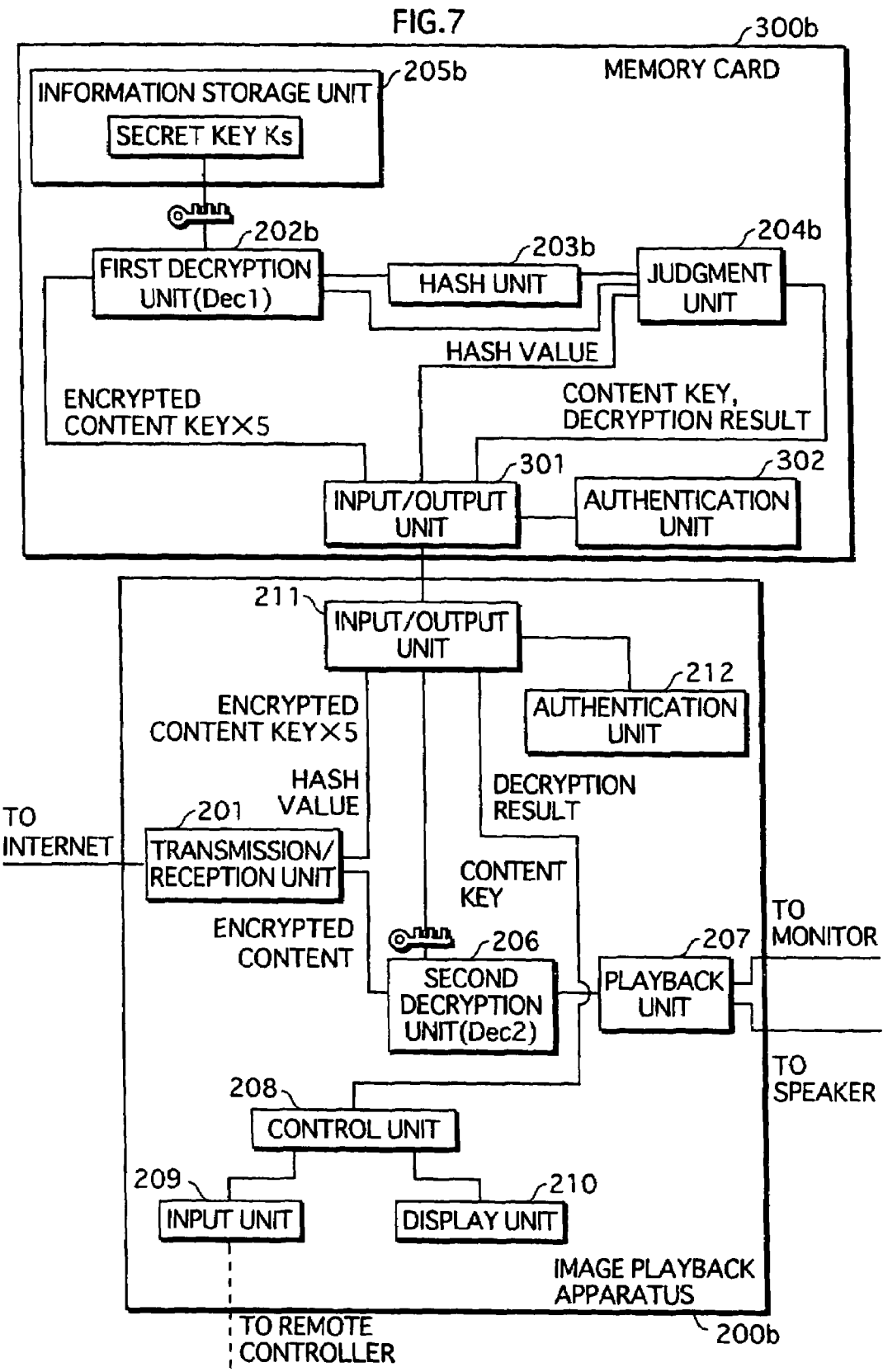
FIG. 7 is a functional block diagram showing the structure of an image playback apparatus 200b and a memory card 300b, which are included in the image playback system 10 being a modification example.

Specifically, as FIG. 7 shows, the image playback apparatus 200b is composed of a transmission/reception unit 201, a second decryption unit 206, a playback unit 207, a control unit 208, an input unit 209, a display unit 210, an input/output unit 211, and an authentication unit 212.

Here, among the components of the image playback apparatus 200b, the transmission/reception unit 201, the second decryption unit 206, the playback unit 207, the control unit 208, the input unit 209, and the display unit 210 are respectively the same as the counterparts of the image playback apparatus 200, namely, the transmission/reception unit 201, the second decryption unit 206, the playback unit 207, the control unit 208, the input unit 209, and the display unit 210. In addition, the input/output unit 211 performs input/output of information between the memory card 300b and the other components of the image playback apparatus 200b. Furthermore, the authentication unit 212, when a memory card is inserted in the image playback apparatus 200b, performs mutual device authentication with the inserted memory card. Only when the device authentication has succeeded, input/output thereafter will be performed.

As FIG. 7 shows, the memory card 300b is composed of an input/output unit 301, an authentication unit 302, a first decryption unit 202b, a hash unit 203b, a judgment unit 204b, and an information storage unit 205b.

Here, the first decryption unit 202b, the hash unit 203b, the judgment unit 204b, and the information storage unit 205b are respectively the same as the counterparts of the image playback apparatus 200, namely, the first decryption unit 202, the hash unit 203, the judgment unit 204, and the information storage unit 205. In addition, the input/output unit 301 performs input/output of information between the other components of the memory card 300b and the image playback apparatus 200b. Furthermore, the authentication unit 302, when the memory card 300b is inserted into an apparatus, performs mutual device authentication with the apparatus in which the memory card 300b has been inserted. Only when the device authentication has succeeded, input/output thereafter will be performed.

(7) Another Embodiment

The following describes a BD (Blu-ray disc) playback system 10c, which is another embodiment relating to the present invention.

Figure 8:
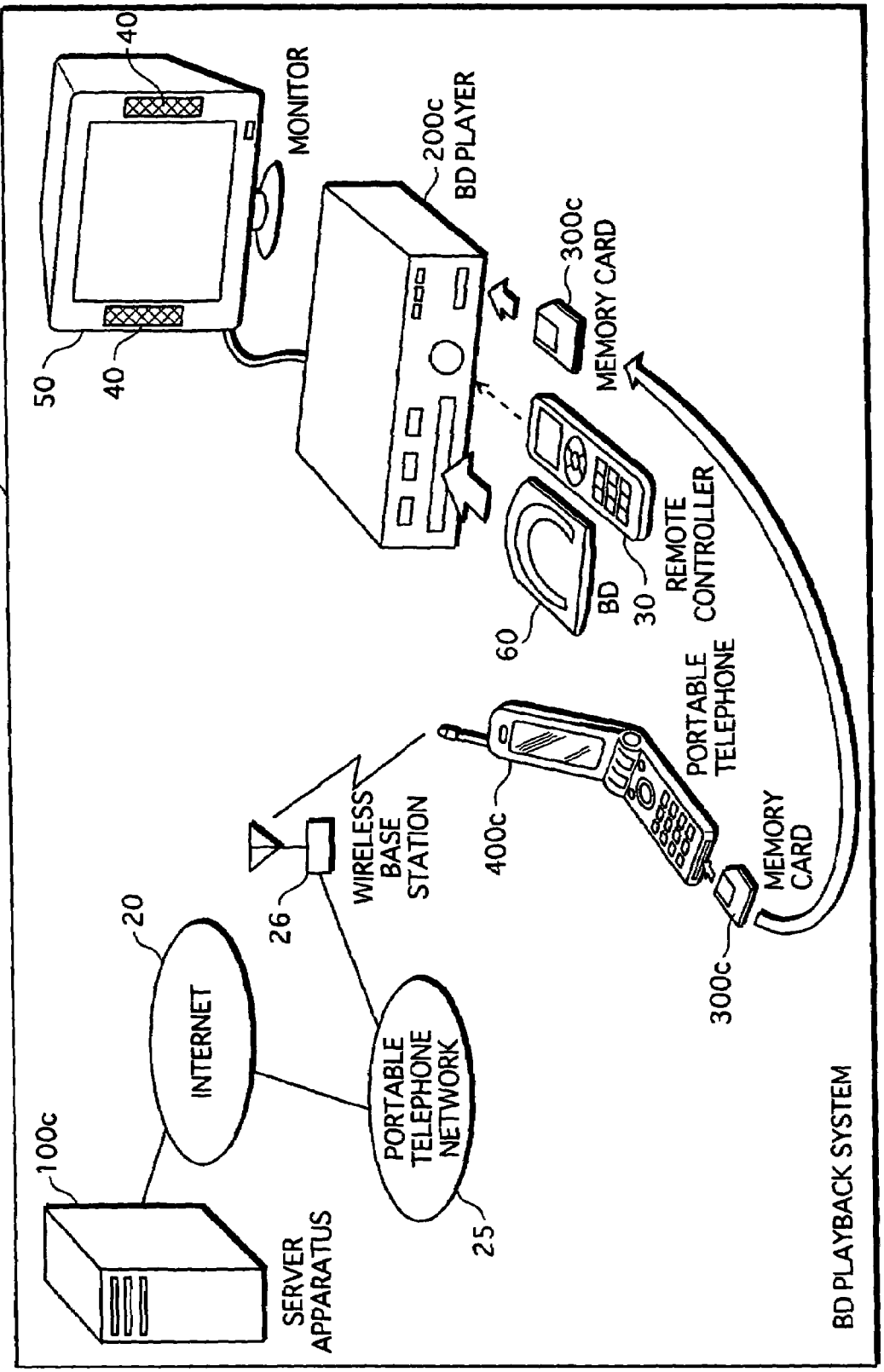
FIG. 8 is a system structure diagram showing the structure of a BD playback system 10c, which is another embodiment relating to the present invention.

As FIG. 8 shows, the BD playback system 10c is composed of a server apparatus 100c, a BD player 200c, and a portable telephone 400c. The server apparatus 100c and the portable telephone 400c are connected to each other, via the Internet 20, the portable telephone network 25, and the wireless base station 26.

(Structure of BD Playback System 10C)

The server apparatus 100c has the same structure as the server apparatus 100.

Figure 9:
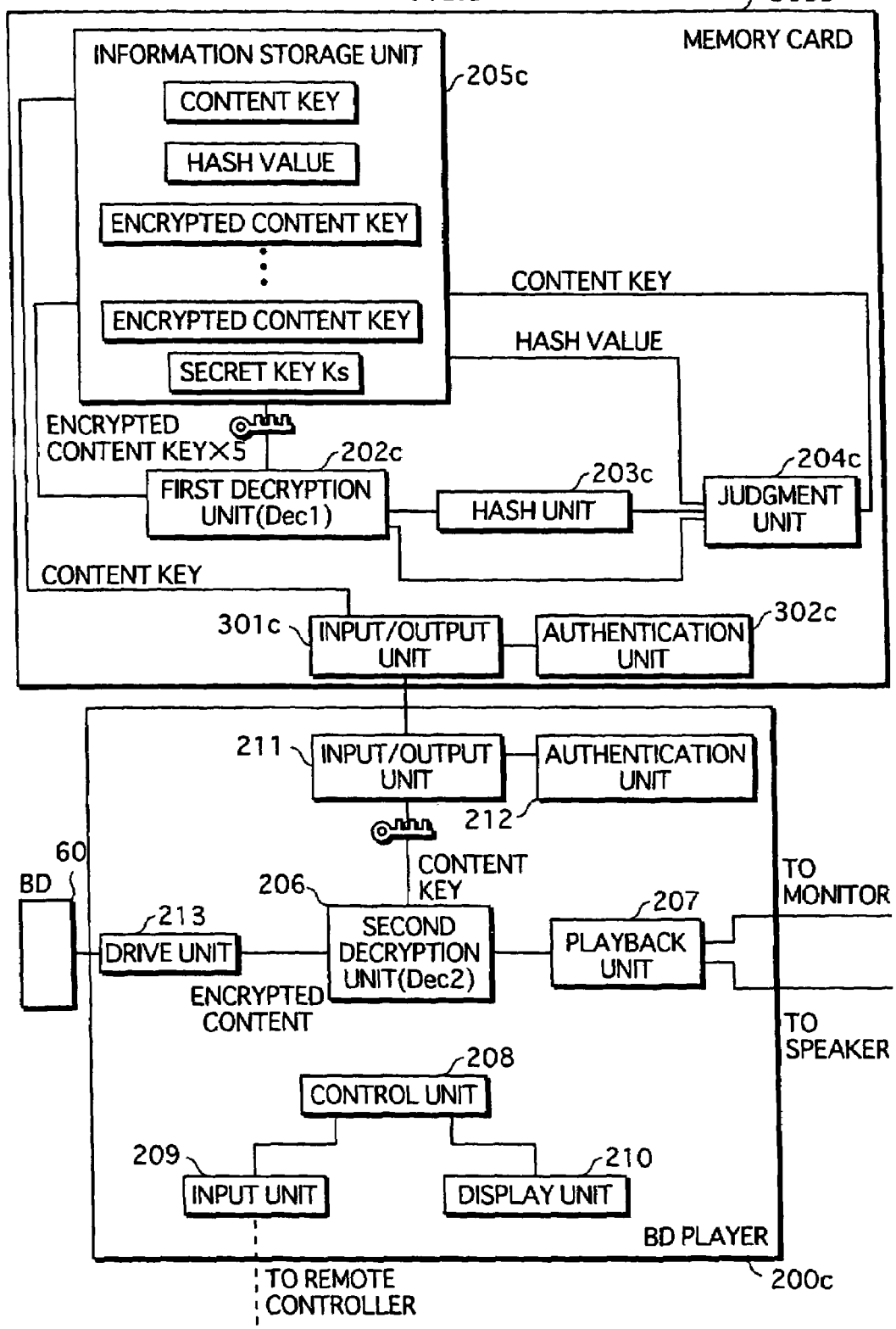
FIG. 9 is a functional block diagram showing the structure of a memory card 300c and a BD player 200c, which are included in the BD playback system 10c.

The BD player 200c, as shown in FIG. 9, is composed of a drive unit 213, a second decryption unit 206, a playback unit 207, a control unit 208, an input unit 209, a display unit 210, an input/output unit 211, and an authentication unit 212.

Here, among the components of the BD player 200c, the second decryption unit 206, the playback unit 207, the control unit 208, the input unit 209, and the display unit 210 are respectively the same as the counterparts of the image playback apparatus 200, namely, the second decryption unit 206, the playback unit 207, the control unit 208, the input unit 209, and the display unit 210. In addition, the input unit 211 performs input/output of information between the memory card 300c and the other components of the BD player 200c. Furthermore, the authentication unit 212, when a memory card is inserted in the BD player 200c, performs mutual device authentication with the inserted memory card. Only when the device authentication has succeeded, input/output thereafter will be performed. The drive unit 213 reads an encrypted content from the inserted BD60, and outputs the read encrypted content to the second decryption unit 206.

As FIG. 9 shows, the memory card 300c is composed of an input/output unit 301c, an authentication unit 302c, a first decryption unit 202c, a hash unit 203c, a judgment unit 204c, and an information storage unit 205c.

Here, the first decryption unit 202c, the hash unit 203c, the judgment unit 204c, and the information storage unit 205c are respectively the same as the counterparts of the image playback apparatus 200, namely, the first decryption unit 202, the hash unit 203, the judgment unit 204, and the information storage unit 205. In addition, the input/output unit 301c performs input/output of information between the other components of the memory card 300c and the BD player 200c. Furthermore, the authentication unit 302c, when the memory card 300c is inserted in an apparatus, performs mutual authentication with the apparatus in which the memory card 300c has been inserted. Only when the device authentication has succeeded, input/output thereafter will be performed. The information storage unit 205 has an area for storing a secret key Ks, five encrypted content keys, a hash value, and a content key having been reproduced.

(Operation of BD Playback System 10c)

A BD60 is distributed, which stores therein an encrypted content generated by encrypting a content with use of a content key. A user acquires this BD60.

The content key is distributed through a different route from a route through which the BD60 is distributed.

Just as the server apparatus 100, the server apparatus 100c generates five encrypted content keys and a hash value from the content keys, and transmits the five encrypted content keys and the hash value to the portable telephone 400c, via the Internet 20, the portable telephone network 25, and the wireless base station 26.

A user inserts the memory card 300c to the portable telephone 400c.

The portable telephone 400c receives the five encrypted content keys and the hash value from the server apparatus 100c, and writes the five encrypted content keys and the hash value to the information storage unit 205c, via the input/output unit 301c of the memory card 300c.

The information storage unit 205c of the memory card 300c temporarily stores the five encrypted content keys and the hash value. The first decryption unit 202c reads, from the information storage unit 205c, encrypted content keys and decodes them, and outputs the content keys after decryption to the hash unit 203c and to the judgment unit 204c. The judgment unit 204c reads the hash value from the information storage unit 205c, and judges whether the encrypted content keys have been correctly decoded, with reference to the content keys after decryption. If judging affirmatively, the judgment unit 204c writes the correctly decoded content key to the information storage unit 205c.

The memory card 300c and the BD60 are inserted into the BD player 200c by a user.

The BD player 200c reads the encrypted content from the BD60, reads the correctly decoded content key from the information storage unit 205c of the memory card 300c, decodes the read encrypted content using the read content key, to generate a content, plays back the generated content, and outputs the images and the audios to the monitor 50 and to the speaker 40, which have been connected to the BD player 200c.

(8) In the above-described embodiment, the NTRU cryptosystem of 263 dimensions is used, and the bit lengths of the secret key and the public key are respectively set as 415 bits, and 1841 bits. However, the dimension and the bit length are only one example.

In addition, the hash unit 104 and the hash unit 203 use SHA-1 as a hash function "Hash". However, other hash functions may be used instead.

(9) The present invention may be the methods described above. In addition, the present invention may be a computer program realizing these methods on a computer, and may be a digital signal made up of the computer program.

Furthermore, the present invention may be a computer-readable recording medium on which the computer program or the digital signal is recorded. The examples of the computer-readable recording medium include a flexible disk, a hard disk, a CD-ROM, a MO, a DVD, a DVD-ROM, a DVD-RAM, a BD (Blu-ray disc), and a semiconductor memory. Still further, the present invention may be the computer program or the digital signal recorded on such a recording medium.

In addition, the present invention may be the computer program or the digital signal, which is transmitted via an electric communication circuit, wireless/wired communication circuits, and a network such as the Internet, and data broadcast.

In addition, the present invention may be a computer system equipped with a microprocessor and a memory, where the memory stores therein the computer program, and the microprocessor operates according to the computer program.

In addition, the computer program or the digital signal may be executed on another and independent computer system, by being transmitted either in the form of the recording medium, or via the network and the like.

(10) The present invention may be combination of any of the embodiments and the modification examples.

3. Effect of Invention

As described so far, the present invention is an encryption communication system for secret message communication, having an encryption transmission apparatus and an encryption reception apparatus, where the encryption transmission apparatus includes: a storage unit that stores therein one message; an encryption unit operable to perform an encryption computation on the message a plural number of times, thereby generating ciphertexts equal in number to the number of times of the encryption computation; a computation unit operable to perform a one-way operation on the message, thereby generating a comparison computation value; and a transmission unit operable to transmit the ciphertexts and the comparison computation value. The encryption reception apparatus includes: a reception unit operable to receive the ciphertexts and the comparison computation value; a decryption unit operable to perform a decryption computation, which corresponds to the encryption computation, on each of the ciphertexts, thereby generating decrypted messages equal in number to the number of the ciphertexts; a computation unit operable to perform the one-way operation on each of the decrypted messages, thereby generating decryption computation values equal in number to the number of the decrypted messages; and a judging unit operable to compare the decryption computation values with the received comparison computation value, and i) if at least one of the decryption computation values matches the received comparison computation value, output a corresponding decrypted message as a correct decrypted text, and ii) if none of the decryption computation values matches the received comparison computation value, output a decryption error.

The present invention is also an encryption transmission apparatus for secret message communication, having: a storage unit that stores therein one message; an encryption unit operable to perform an encryption computation on the message a plural number of times, thereby generating ciphertexts equal in number to the number of times of the encryption computation; a computation unit operable to perform a one-way operation on the message, thereby generating a comparison computation value; and a transmission unit operable to transmit the ciphertexts and the comparison computation value.

The present invention is also an encryption reception apparatus for secret message communication, where the encryption transmission apparatus stores therein one message, performs an encryption computation on the message a plural number of times thereby generating ciphertexts equal in number to the number of the encryption computation, performs a one-way operation on the message thereby generating a comparison computation value, and transmits the ciphertexts and the comparison computation value. The encryption reception apparatus having: a reception unit operable to receive the ciphertexts and the comparison computation value; a decryption unit operable to perform a decryption computation, which corresponds to the encryption computation, on each of the ciphertexts, thereby generating decrypted messages equal in number to the number of the ciphertexts; a computation unit operable to perform the one-way operation on each of the decrypted messages, thereby generating decryption computation values equal in number to the number of the decrypted messages; and a judging unit operable to compare the decryption computation values with the received comparison computation value, and i) if at least one of the decryption computation values matches the received comparison computation value, output a corresponding decrypted message as a correct decrypted text, and ii) if none of the decryption computation values matches the received comparison computation value, output a decryption error.

According to these constructions, the encryption transmission apparatus generates a plural number of ciphertexts from a message, and performs a one-way computation on the message to generate a comparison computation value. The encryption reception apparatus decrypts the ciphertexts thereby generating decrypted messages equal in number to the number of the ciphertexts, and performs the one-way computation on the decrypted messages to generate decryption computation values equal in number to the number of the decrypted messages. If at least one of the decryption computation values matches the comparison computation value, the encryption transmission apparatus outputs the corresponding decryption message, and if none of the decryption computation values matches the comparison computation value, outputs a decryption error. Therefore the above-mentioned constructions restrain a probability of error generation at the time of decryption to below, and so heighten possibility of avoiding attacks that take advantage of re-transmission request.

Here, the encryption unit may have: an encryption computation subunit operable to perform an invertible data conversion on the message thereby generating a converted message, and perform an encryption algorithm on the converted message thereby generating a ciphertext; and a repetition control subunit operable to control the encryption computation subunit to repeat the generation of converted message and the generation of ciphertext, the plural number of times.

In addition, it is possible to have a structure in which the encryption transmission apparatus performs an invertible data conversion on the message thereby generating a converted message, performs an encryption algorithm on the converted message thereby generating a ciphertext, and repeats the generation of converted message and the generation of ciphertext, the plural number of times, and the decryption unit has: a decryption computation subunit operable to perform a decryption algorithm, which corresponds to the encryption algorithm, on a ciphertext thereby generating a decrypted text, and perform an inverse conversion of the invertible data conversion on the decrypted text thereby generating a decrypted message; and a repetition control subunit operable to control the decryption computation subunit to repeat the generation of decrypted content and the generation of decrypted message, the plural number of times.

According to these constructions, the encryption transmission apparatus performs an invertible data conversion on the message to generate a converted message, and performs an encryption algorithm on the converted message to generate a ciphertext. Therefore even when the ciphertext to be transmitted is intercepted on the transmission path and is encrypted, the original message has little chance of being revealed. In addition, the encryption reception apparatus performs, on the ciphertext, a decryption algorithm that corresponds to the encryption algorithm to generate a decrypted text, and performs an inverse conversion of the invertible data conversion on the decrypted text to generate a decrypted message. Therefore generation of a decrypted message corresponding to the message is assured.

Here, the encryption computation subunit may generate a random number of fixed length, and generates the converted message by adding the random number to the message.

In addition, it is possible to have a structure in which the encryption transmission apparatus generates a random number of fixed length, and generates the converted message by adding the random number to the message, and the decryption computation subunit generates the decrypted message by removing the random number of fixed length from the decrypted content.

According to these constructions, the encryption transmission apparatus adds a random number of fixed length to the message, thereby generating a converted message. Therefore an inverse conversion is easily performed. In addition, the encryption reception apparatus removes, from the generated decrypted text, the random number of fixed length to generate a decrypted message. Therefore generation of a decrypted message is assured.

Each of the apparatuses and of the recording media, which constitutes the present invention, may be used managerially, continuously, and repeatedly, in any industry related to secret message communication. Furthermore, each of the apparatuses and of the recording media, which constitutes the present invention, may be produced and sold in manufacturing industries of electric appliances, managerially, continuously, and repeatedly.

The invention claimed is:

1. An encryption communication system for secret message communication, the encryption communication system comprising an encryption transmission apparatus and an encryption reception apparatus,
   wherein the encryption transmission apparatus includes:
     a storage unit that stores one message;
     an encryption unit operable to perform an encryption computation on the one message a plural number of times to generate a plurality of encrypted messages from the one message, a number of encrypted messages generated from the one message by the encryption unit being equal to the number of times the encryption unit performs the encryption computation on the one message;
     a computation unit operable to perform a one-way operation on the one message to generate only one comparison computation value from the one message; and
     a transmission unit operable to transmit, to the encryption reception apparatus, the plurality of the encrypted messages and the one comparison computation value, and
   wherein the encryption reception apparatus includes:
     a reception unit operable to receive, from the encryption transmission apparatus, the plurality of the encrypted messages and the one comparison computation value;
     a decryption unit operable to perform a decryption computation corresponding to the encryption computation, the decryption computation being performed on each of the encrypted messages to generate a plurality of decrypted messages, and a number of decrypted messages generated by the decryption unit being equal to the number of encrypted messages generated from the one message by the encryption unit;
     a computation unit operable to perform the one-way operation on each of the decrypted messages to generate a plurality of decryption computation values, a number of decryption values generated by the computation unit being equal to the number of the decrypted messages generated by the decryption unit; and
     a judging unit operable to compare each of the decryption computation values with the one received comparison computation value,
     wherein (i) when at least one of the decryption computation values matches the one received comparison computation value, the judging unit outputs a decrypted message as a correct decrypted message, and (ii) when none of the decryption computation values matches the one received comparison computation value, the judging unit determines that there is a decryption error.

2. The encryption communication system of claim 1,
   wherein the encryption computation used by the encryption unit conforms to NTRU cryptosystem, and
   wherein the decryption computation used by the decryption unit conforms to the NTRU cryptosystem.

3. The encryption communication system of claim 1,
   wherein the encryption unit performs a predetermined computation on the one message a plural number of times to generate a plurality of computation results, and performs the encryption computation on each computation result of the generated plurality of computation results to generate the plurality of encrypted messages from the one message, and
   wherein the decryption unit performs the decryption computation on each encrypted message of the generated plurality of encrypted messages to generate a plurality of decryption results, and performs an inverse computation of the predetermined computation on each decryption result of the generated plurality of decryption results the plural number of times to generate the plurality of decrypted messages.

4. An encryption transmission apparatus for secret message communication with an encryption reception apparatus, the encryption transmission apparatus comprising: a storage unit that stores one message; an encryption unit operable to perform an encryption computation on the one message a plural number of times to generate a plurality of encrypted messages from the one message, a number of encrypted messages generated from the one message by the encryption unit being equal to the number of times the encryption unit performs the encryption computation on the one message; a computation unit operable to perform a one-way operation on the one message to generate only one comparison computation value from the one message; and a transmission unit operable to transmit, to the encryption reception apparatus, the plurality of the encrypted messages and the one comparison computation value, wherein the encryption unit comprises: an encryption computation subunit operable to perform an invertible data conversion on the one message to generate a converted message, and perform an encryption algorithm on the converted message to generate one encrypted message; and a repetition control subunit operable to control the encryption computation subunit to repeat the generation of the converted message and the generation of the one encrypted message, the generation of the converted message and the generation of the one encrypted message being repeated the plural number of times the encryption unit performs the encryption computation on the one message to generate the plurality of encrypted messages.

5. The encryption transmission apparatus of claim 4, wherein the encryption computation subunit generates a random number of a fixed length, and generates the converted message by adding the random number to the one message.

6. The encryption transmission apparatus of claim 5, wherein the encryption algorithm used by the encryption computation subunit on the converted message conforms to NTRU cryptosystem.

7. The encryption transmission apparatus of claim 4,
   wherein the encryption unit performs a predetermined computation on the one message a plural number of times to generate a plurality of computation results, and performs the encryption computation on each computation result of the generated plurality of computation results to generate the plurality of encrypted messages from the one message.

8. An encryption reception apparatus for secret message communication with an encryption transmission apparatus, the encryption transmission apparatus storing one message, performing an encryption computation on the one message a plural number of times to generate a plurality of encrypted messages from the one message, a number of encrypted messages generated from the one message by the encryption transmission apparatus being equal to the number of times the encryption transmission apparatus performs the encryption computation on the one message, performing a one-way operation on the one message to generate only one comparison computation value from the one message, and transmitting, to the encryption reception apparatus, the plurality of encrypted messages and the one comparison computation value, the encryption reception apparatus comprising:

a reception unit operable to receive, from the encryption transmission apparatus, the plurality of the encrypted messages and the one comparison computation value;

a decryption unit operable to perform a decryption computation corresponding to the encryption computation, the decryption computation being performed on each of the encrypted messages to generate a plurality of decrypted messages, and a number of decrypted messages generated by the decryption unit being equal to the number of encrypted messages generated from the one message by the encryption transmission apparatus;

a computation unit operable to perform the one-way operation on each of the decrypted messages to generate a plurality of decryption computation values, a number of decryption computation values generated by the computation unit being equal to the number of the decrypted messages generated by the decryption unit; and a judging unit operable to compare each of the decryption computation values with the one received comparison computation value, wherein (i) when at least one of the decryption computation values matches the one received comparison computation value, the judging unit outputs a decrypted message as a correct decrypted message, and (ii) when none of the decryption computation values matches the one received comparison computation value, the judging unit determines that there is a decryption error.

9. The encryption reception apparatus of claim 8, wherein the encryption transmission apparatus performs an invertible data conversion on the one message to generate a converted message, performs an encryption algorithm on the converted message to generate one encrypted message, and repeats the generation of the converted message and the generation of the one encrypted message, the generation of the converted one message and the generation of the one encrypted message being repeated the plural number of times the encryption unit performs the encryption computation on the one message to generate the plurality of encrypted messages, and wherein the decryption unit comprises:

a decryption computation subunit operable to perform a decryption algorithm corresponding to the encryption algorithm, on one of the plurality of the encrypted messages to generate one decrypted text, and perform an inverse conversion of the invertible data conversion on the one decrypted text to generate one decrypted message; and a repetition control subunit operable to control the decryption computation subunit to repeat the generation of the one decrypted content and the generation of the one decrypted message, the generation of the one decrypted content and the generation of the one decrypted message being repeated the plural number of times the decryption unit performs the decryption computation to generate the plurality of the decrypted messages being equal in number to the number of encrypted messages generated from the one message by the encryption unit.

10. The encryption reception apparatus of claim 9, wherein the encryption transmission apparatus generates a random number of a fixed length, and generates the converted message by adding the random number to the one message, and wherein the decryption computation subunit generates the one decrypted message by removing the random number of the fixed length from the one decrypted text.

11. The encryption reception apparatus of claim 10, wherein the encryption algorithm used by the encryption transmission apparatus conforms to NTRU cryptosystem, and wherein the decryption algorithm used by the decryption computation subunit conforms to the NTRU cryptosystem.

12. The encryption reception apparatus of claim 8, wherein the encryption transmission apparatus performs a predetermined computation on the one message a plural number of times to generate a plurality of computation results, and performs the encryption computation on each computation result of the generated plurality of computation results to generate the plurality of encrypted messages from the one message, and wherein the decryption unit performs the decryption computation on each encrypted message of the generated plurality of encrypted messages to generate a plurality of decryption results, and performs an inverse computation of the predetermined computation on each decryption result of the generated plurality of decryption results the plural number of times to generate the plurality of decrypted messages.

13. An encryption transmission method used in an encryption transmission apparatus, the encryption transmission apparatus storing one message and transmitting the one message in secrecy to an encryption reception apparatus, the encryption transmission method comprising: performing an encryption computation on the one message a plural number of times to generate a plurality of encrypted messages from the one message, a number of encrypted messages generated from the one message by the performing of the encryption computation being equal to the number of times the performing of the encryption computation performs the encryption computation on the one message; performing a one-way operation on the one message to generate only one comparison computation value from the one message; and transmitting, to the encryption reception apparatus, the plurality of the encrypted messages and the one comparison computation value, wherein the performing of the encryption computation further comprises: performing an invertible data conversion on the one message to generate a converted message, and performing an encryption algorithm on the converted message to generate one encrypted message; and controlling the performing of the invertible data conversion to repeat the generation of the converted message and the generation of the one encrypted message, the generation of the converted message and the generation of the one encrypted message being repeated the plural number of times the performing of the encryption computation performs the encryption computation on the one message to generate the plurality of encrypted messages.

14. A computer-readable recording medium having an encryption transmission program recorded thereon, the encryption transmission program being used in an encryption transmission apparatus, the encryption transmission apparatus storing one message and transmitting the message in secrecy to an encryption reception apparatus, the encryption transmission program causing the encryption transmission apparatus to execute a method comprising: performing an encryption computation on the one message a plural number of times to generate a plurality of encrypted messages from the one message, a number of encrypted messages generated from the one message by the performing of the encryption computation being equal to the number of times the performing of the encryption performs the encryption computation on the one message; performing a one-way operation on the one message to generate only one comparison computation value from the one message; and transmitting, to the encryption reception apparatus, the plurality of the encrypted messages and the one comparison computation value, wherein the performing of the encryption computation further comprises: performing an invertible data conversion on the one message to generate a converted message, and performing an encryption algorithm on the converted message to generate one encrypted message; and controlling the performing of the invertible data conversion to repeat the generation of the converted message and the generation of the one encrypted message, the generation of the converted message and the generation of the one encrypted message being repeated the plural number of times the performing of the encryption computation performs the encryption computation on the one message to generate the plurality of encrypted messages.

15. An encryption reception method used in an encryption reception apparatus, the encryption reception apparatus receiving a message from an encryption transmission apparatus in secrecy, the encryption transmission apparatus storing one message, performing an encryption computation on the one message a plural number of times to generate a plurality of encrypted messages from the one message, a number of encrypted messages generated from the one message by the encryption transmission apparatus being equal to the number of times the encryption transmission apparatus performs the encryption computation on the one message, performing a one-way operation on the one message to generate only one comparison computation value from the one message, and transmitting, to the encryption reception apparatus, the plurality of encrypted messages and the one comparison computation value, the encryption reception method comprising:
receiving, from the encryption transmission apparatus, the plurality of the encrypted messages and the one comparison computation value;
performing a decryption computation corresponding to the encryption computation, the decryption computation being performed on each of the encrypted messages to generate a plurality of decrypted messages, and a number of decrypted messages generated by the performing of the decryption computation being equal to the number of encrypted messages generated from the one message by the encryption transmission apparatus;
performing the one-way operation on each of the decrypted messages to generate a plurality of decryption computation values, a number of decryption computation values generated by the performing of the one-way operation being equal to the number of the decrypted messages generated by the performing of the decryption computation;
comparing each of the decryption computation values with the one received comparison computation value;
outputting a decrypted message that corresponds to a decryption computation value that matches the one received comparison computation value, based on the comparing, as a correct decrypted message when at least one of the plurality of the decryption computation values matches the one received comparison computation value; and
determining that there is a decryption error when, as a result of the comparing, none of the decryption computation values matches the one received comparison computation value.

16. A computer-readable recording medium having an encryption reception program recorded thereon, the encryption reception program being used in an encryption reception apparatus, the encryption reception apparatus receiving a message from an encryption transmission apparatus in secrecy, the encryption transmission apparatus storing one message, performing an encryption computation on the one message a plural number of times to generate a plurality of encrypted messages from the one message, a number of encrypted messages generated from the one message by the encryption transmission apparatus being equal to the number of times the encryption transmission apparatus performs the encryption computation on the one message, performing a one-way operation on the one message to generate only one comparison computation value from the one message, and transmitting, to the encryption reception apparatus, the plurality of encrypted messages and the one comparison computation value, the encryption reception program comprising:
receiving, from the encryption transmission apparatus, the plurality of the encrypted messages and the one comparison computation value;
performing a decryption computation corresponding to the encryption computation, the decryption computation being performed on each of the encrypted messages to generate a plurality of decrypted messages, and a number of decrypted messages generated by the performing of the decryption computation being equal to the number of encrypted messages generated from the one message by the encryption transmission apparatus;
performing the one-way operation on each of the decrypted messages to generate a plurality of decryption computation values, a number of decryption computation values generated by the performing of the one-way operation being equal to the number of the decrypted messages generated by the performing of the decryption computation;
comparing each of the decryption computation values with the one received comparison computation value;
outputting a decrypted message that corresponds to a decryption computation value that matches the one received comparison computation value, based on the comparing, as a correct decrypted message when at least one of the plurality of the decryption computation values matches the one received comparison computation value; and
determining that there is a decryption error when, as a result of the comparing, none of the decryption computation values matches the one received comparison computation value.

* * * * *